(12) United States Patent
Goering et al.

(10) Patent No.: US 7,249,449 B2
(45) Date of Patent: Jul. 31, 2007

(54) CONVEYING DUCT PRESSURE MONITOR SYSTEM FOR CONTROLLING HARVESTER SPEED

(75) Inventors: Kevin Jacob Goering, Cambridge, IA (US); Philip Eugene Ferree, Ankeny, IA (US); Alan Lee Dzubak, Johnston, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/887,963

(22) Filed: Jul. 9, 2004

(65) Prior Publication Data

US 2006/0005521 A1    Jan. 12, 2006

(51) Int. Cl.
A01D 46/08        (2006.01)
(52) U.S. Cl. ........................................................ 56/30
(58) Field of Classification Search ..................... 56/30, 56/10.2 R; 340/684, 608
See application file for complete search history.

(56) References Cited

U.S. PATENT DOCUMENTS

| | | | |
|---|---|---|---|
| 2,698,929 A | 1/1955 | Greacen, III et al. ........ 340/239 |
| 3,863,428 A | 2/1975 | Baxter ......................... 56/10.2 |
| 4,068,223 A | 1/1978 | Steffen ..................... 340/267 R |
| 4,458,471 A * | 7/1984 | Herwig ..................... 56/10.2 G |
| 4,487,002 A * | 12/1984 | Kruse et al. ..................... 460/6 |
| 4,606,177 A | 8/1986 | Schlueter ......................... 56/30 |
| 4,635,047 A | 1/1987 | Fox et al. ..................... 340/684 |
| 4,961,304 A * | 10/1990 | Ovsborn et al. .......... 56/10.2 R |
| 5,025,614 A | 6/1991 | Orsborn et al. ............... 56/10.2 |
| 5,063,729 A | 11/1991 | Fox et al. ....................... 56/30 |
| 5,392,495 A | 2/1995 | Horn ........................... 19/55 R |
| 5,490,372 A | 2/1996 | Schlueter ......................... 56/33 |
| 5,832,708 A | 11/1998 | Sugden ......................... 56/202 |
| 5,920,018 A | 7/1999 | Wilkerson et al. ........ 73/861.41 |
| 5,923,262 A * | 7/1999 | Fuss et al. ................... 340/684 |
| 6,321,516 B1 | 11/2001 | Wigdahl et al. ............... 56/30 |
| 6,363,700 B1 | 4/2002 | Fowler ......................... 56/13.9 |
| 6,421,991 B1 | 7/2002 | Goering et al. ................. 56/28 |
| 6,431,981 B1 * | 8/2002 | Shinners et al. ................ 460/6 |
| 6,460,008 B1 * | 10/2002 | Hardt ......................... 702/156 |
| 6,546,709 B2 | 4/2003 | Goering et al. ................. 56/28 |
| 6,584,390 B2 * | 6/2003 | Beck ........................... 701/50 |

FOREIGN PATENT DOCUMENTS

SU        1378895 A    *    3/1988

* cited by examiner

Primary Examiner—Árpád Fábián Kovács

(57) ABSTRACT

A differential pressure sensor measures the vacuum in a material conveying duct relative to atmospheric pressure or to a positive pressure farther upstream in the duct on an agricultural harvester. The output from this sensor is monitored electronically, and the resulting output is used to optimize harvester speed. In one embodiment, a processor monitor output is used in conjunction with the pressure sensor output to control ground speed. Processor speed or loading and air duct pressure are monitored to determine which area of the machine is the limiting factor and to adjust the harvester speed accordingly.

13 Claims, 1 Drawing Sheet

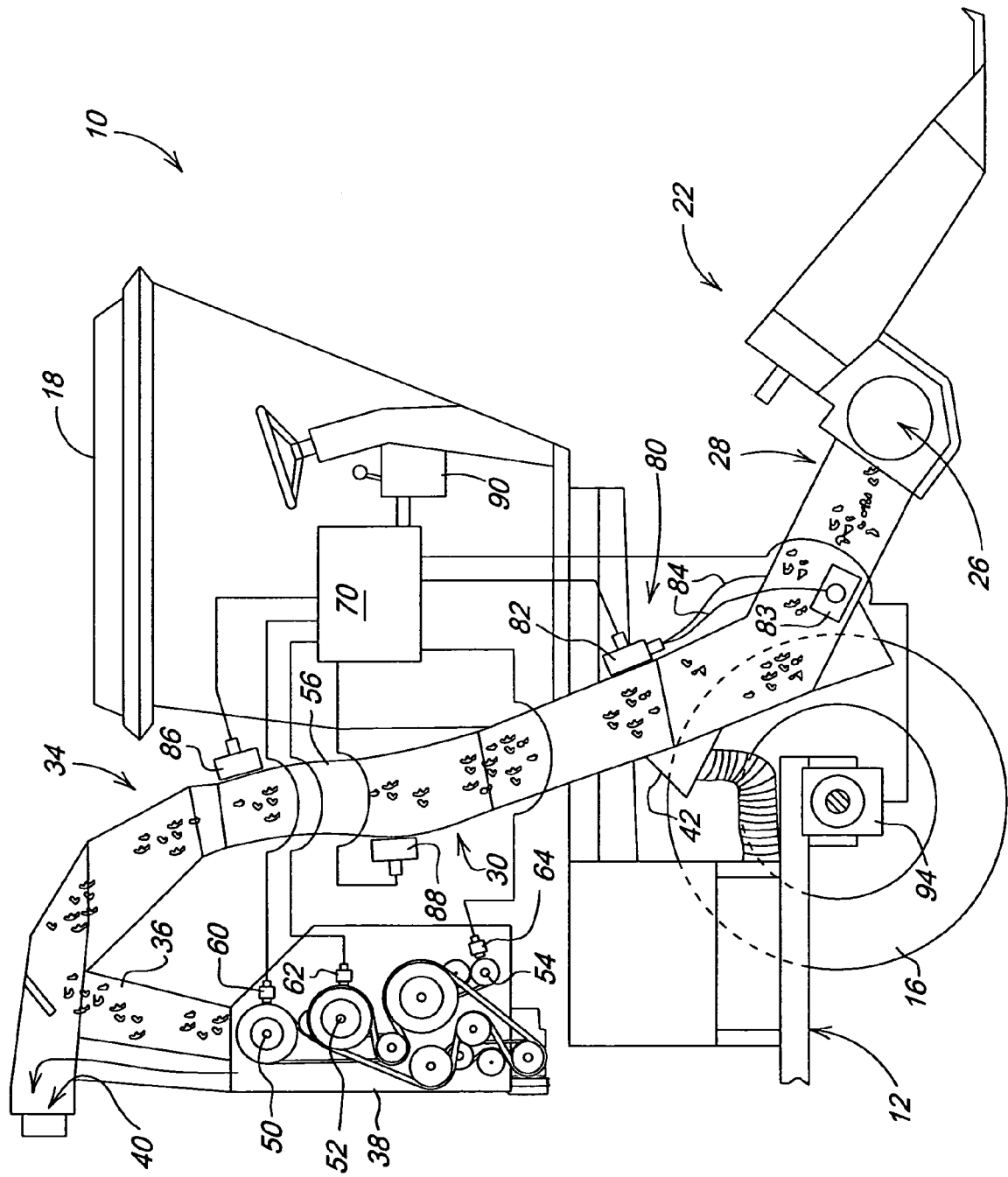

CONVEYING DUCT PRESSURE MONITOR SYSTEM FOR CONTROLLING HARVESTER SPEED

FIELD OF THE INVENTION

The present invention relates generally to an agricultural harvester having an air duct system to convey harvested material and, more specifically, to a device for controlling harvester speed dependent on the pressure in the duct system.

BACKGROUND OF THE INVENTION

The harvesting capacity of a cotton harvester is determined by the capacity of the harvesting unit to remove the cotton from the plant and the capacity of the air system to convey the cotton downstream from the harvesting unit. If the harvester is a cotton stripper equipped with a cotton cleaner, the capacity of the cleaner to process and remove the burs and foreign material from the cotton also affects the overall machine capacity.

The operator can see when the row units are operating at or above capacity by the amount of cotton left on the stalk, and in over-speed conditions, excess cotton will remain. However, a monitor system is required for the operator to determine if the air system and cleaner are running close to capacity. Current cotton strippers have a speed sensor on the top saw of the cleaner. A readout in the cab provides top saw speed which gives the operator an indication of percent of full capacity of the cleaner. If the top saw slows below a predetermined lower speed, an audible alarm and light will be activated to warn the operator that the machine must be slowed to avoid cleaner plugging. Conversely, the readout informs the operator there is additional capacity in the cleaner so machine speed can be increased to gain productivity.

Many cotton material conveying systems include a nozzle pointed downstream in the air duct to induce a vacuum in the lower part of the duct which draws removed material upwardly. Manually adjustable vacuum switches using a spring and diaphgram are available to measure the difference in pressure between the lower portion of the air duct and the cab. When the vacuum falls below the set point as a result duct capacity being approached or exceeded, the sensor triggers a light and audible alarm to warn the operator to decrease harvester speed. Several problems exist with present vacuum monitoring systems. First, the systems measure the vacuum relative to cab pressure, and cab pressure can vary if the cab air conditioning system blower speed is changed, the cab door is opened, or the cab inlet filter gets plugged. Any such variance requires the operator to reset the sensor for effective operation. Secondly, setting the sensor requires a trial and error approach wherein the operator increases speed until the machine plugs to see if the sensor is set correctly. If the setting is incorrect, the operator must readjust the setting to try to initiate a warning just before the duct blockage condition occurs. The third problem with the current vacuum system is inability of such a system to inform the operator when there is additional capacity available in the air system. As a result, machine productivity is compromised.

SUMMARY OF THE INVENTION

It is therefore an object of the present invention to provide an improved system for monitoring a harvester air duct system. It is a further object to provide such a system which overcomes most or all of the aforementioned problems.

It is another object of the present invention to provide an improved system for monitoring a harvester air duct system which is reliable, easy to calibrate and unaffected by changes in air pressure in the cab of the harvester. It is yet a further object to provide such a system which helps the harvester operator maintain peak machine productivity and reduces incidences of the machine overload or under-capacity operation.

It is still another object of the invention to provide an improved air duct monitoring system for a cotton harvester. It is another object to provide such a system which can be utilized to maintain optimum harvester operating speed and which can be combined with a monitor for another area, such as a cleaner, to determine which area is the capacity limiting factor on the harvester and select that area monitor to control operating speed.

One system constructed in accordance with the teachings of the present invention utilizes a temperature compensated differential pressure sensor to measure the vacuum in the duct relative to atmospheric pressure or to a positive pressure farther upstream in the duct. The output from this sensor is monitored electronically and can be displayed and/or used to optimize vehicle speed. In addition, a machine processor monitor output can be used in conjunction with the pressure sensor to control ground speed. Cleaner speed and vacuum in the air duct are monitored to determine which area of the machine is the limiting factor and to adjust harvester speed dependent on that limiting factor.

The system is not affected by the variation in cab pressure. Therefore, need for resetting is reduced or eliminated, or achieved automatically. Additionally, the system continuously identifies duct vacuum, which will allow the operator or an automatic speed control system to adjust vehicle ground speed to optimize performance. Loading on a crop processor structure is also monitored to provide a load indication which is used to control harvester ground speed. The system allows an inexperienced person to operate the machine near maximum capacity without plugging and relieves operator stress by automatically controlling the ground speed. The operator does not have to watch the cleaner speed and vacuum as closely and has more time to monitor and control other machine functions.

These and other objects, features and advantages of the present invention will become apparent upon reading the following detailed description in view of the drawings.

BRIEF DESCRIPTION OF THE DRAWINGS

FIG. 1 is a side view of a portion of a harvester having an air duct system and a crop processing unit.

DESCRIPTION OF THE PREFERRED EMBODIMENT

Referring now to FIG. 1, therein is shown a cotton harvester 10 having a main frame 12 supported for forward movement over the ground by forward drive wheels 16 and rear steerable wheels (not shown). A cab 18 is supported on the forward end of the frame 12. A lift frame is adjustably supported from the forward end of the frame 12 for mounting a conventional header 22 for stripping cotton material from rows of cotton plants. The header 22 includes a cross auger 26 for conveying stripped cotton and other material to a central outlet location which opens rearwardly into a separation duct 28.

Air duct structure 30 with an S-shaped configuration curves upwardly and rearwardly from the separation duct 28 to an upper separation grate area structure 34 which selectively directs conveyed material downwardly through an input duct 36 to an on-board processor such as a cotton cleaner 38 as shown in FIG. 1, or rearwardly to a basket or receptacle through an outlet area 40. The grate area 34 is supported from the frame via duct 36 and cleaner 38 and provides principle support for the duct structure 30. An air system including an air jet nozzle structure 42 in the rear of the duct structure 30 directs air upwardly and induces air flow upwardly from the duct 28 to direct cotton and other light material rearwardly and upwardly towards the grate area structure 34. Heavy materials such as green bolls drop from the stream of conveyed material through openings near the bottom of the separation duct 28 and below the grate area structure 34, while light trash exits through the grate area 34. For further details of the duct structure 30 and separation grate area structure 34, reference may be had to U.S. Pat. Nos. 4,606,177 and 6,321,516.

The onboard processor 38 includes several drives 50, 52 and 54 with drive shaft monitors 60, 62 and 64. As shown, the drives 50, 52 and 54 provide power to feeder, primary saw, and reclaimer saw drums, and drive to an auger and cleaner fan. The shaft monitors 60, 62 and 64 provide a signal to an electronic controller 70 on the harvester indicative of loading on the drives. For example, shaft speeds can be monitored, and if the processor 38 is overloaded with an excess amount of harvested material, the shaft speed on one or more of the drives 50, 52 and 54 will slow below a preselected acceptable speed range. During field operations, the controller 70 polls the shaft monitors 60, 62 and 64 and provides an indication of processor loading and of pending or actual shaft overload conditions so the operator can slow the machine to bring loads at the processor into the desired operating ranges. In addition to detecting and warning of potential overload conditions, the processor also provides an indication of the percentage of processor utilization so that the harvester speed can be controlled to better utilize machine capacity and increase productivity.

A pressure monitor system indicated generally at 80 is provided at the duct structure 30 and is connected to the electronic controller 70. The monitor system 80 includes at least one duct pressure monitor 82 for providing pressure signals indicative of the pressure in the duct at one or more locations 83 in the duct. The pressure at the location 83 relative to atmospheric pressure outside the cab 18 is determined. The pressure monitor 82 includes a pressure input connected by tubes 84 to vacuum sensor ports at location 83 on each side of the lower portion of the duct structure 30. The monitor 82 is attached to the harvester at a protected location. As shown in FIG. 1, the port locations 83 are below the jet nozzle structure 42 in a duct area having a negative pressure relative to atmosphere during normal harvesting operations. If the duct structure 30 approaches a maximum capacity condition or a blockage begins to form, the vacuum level below the jet nozzle structure will decrease below a preselected minimum value. In one embodiment of the invention, the electronic controller 70 provides an indication of the problem so the operator can slow or stop the harvester to alleviate the duct overload or potential overload condition before a blockage occurs. The controller 70 can include a readout device, an audio or visual warning device, or a combination of devices for indicating under- and overcapacity conditions and percentage of maximum capacity usage. The pressure monitor system 80 is temperature compensated for accuracy over a wide range of operating conditions. For example, the monitor 82 can include temperature compensation to reduce or eliminate calibration requirements.

Additional pressure monitors such as shown at 86 and 88 may be added to monitor pressure at different locations in the air system on the harvester to facilitate early warning of potential problems such as overloads or blockages of the duct and provide additional diagnostic information to the operator. Pressures at the different areas are monitored by the controller 70 and compared to each other or to atmospheric pressure outside the cab 18. If a pressure reading at one of the monitors is outside of an acceptable range relative to either atmosphere or to another monitor reading, a warning is provided. The multiple pressure monitors also facilitate optimization of maximum duct structure utilization. A single pressure monitor such as the lower vacuum monitor 82 can be utilized to provide pressure signals to the controller 70 for calculating an estimated duct structure percentage of capacity utilization or other suitable capacity-related indication to display to the operator for use with the processor utilization indication to control harvester speed for optimum productivity. Comparing relative pressure readings at more than one location in the air system can reduce system warning response time and increase sensitivity for certain blockage or overload conditions. The pressure monitor system 80, in combination with drive shaft monitoring on the processor 38 to provide an indication of the shaft speed and/or loading of the processor, assures that a potential overload or blockage anywhere between the auger 26 and the outlet area 40 is timely and reliably detected. Harvester speed can be adjusted easily to maintain duct capacity usage close to the maximum duct capacity.

In a further embodiment of the invention, the controller 70 also controls machine harvest speed automatically. The controller 70 is connected to an operator speed control 90 and controls a hydrostatic transmission 94 connected to the drive wheels 16. The controller 70 is responsive to the speed control 90 and to the load indicating signals provided by one or more of the monitors 60, 62 and 64 and by the pressure monitor 82 and any additional monitors on the drive or air system. In an automatic speed control mode, the controller 70 causes the harvester to move at a speed up to the maximum speed determined by the setting of the speed control and by the capacity indications. Maximum set speed will be maintained if the capacity indications from the processor 38 and the duct structure 30 are all within acceptable ranges. However, if the controller 70 determines that a maximum capacity condition is approached or reached at either the duct structure 30 or the on-board processor 38, the controller 70 causes the harvester 10 to slow as necessary to alleviate the potential overload or blockage condition and to maintain the monitor signals within their desired ranges. If the bypass grate structure 34 is moved to bypass the processor 38 so harvested material is propelled directly from the duct structure 30 through the outlet area 40 into the basket, the controller 70 in the automatic speed control mode adjusts harvester speed up to the maximum speed set by the control 90 and assures that maximum duct capacity is not exceeded. The controller 70 can provide an indication to the operator when both the processor and duct capacities are consistently below maximum allowable so that the setting of the upper limit set by speed control 90 can be increased if field conditions permit.

Having described the preferred embodiment, it will become apparent that various modifications can be made without departing from the scope of the invention as defined in the accompanying claims.

The invention claimed is:

1. A monitor system for a cotton harvester including a harvesting unit for removing cotton crop material from a field and an air duct system for propelling the removed crop material away from the harvesting unit, the air duct system having a maximum material conveying capacity, the monitor system including air pressure sensor means for providing an air duct system air pressure indication indicative of the amount of cotton material in the air duct system, and means responsive to the system pressure indication providing automatic control of the harvester to operate the air duct system generally at or near the maximum material conveying capacity, wherein the air duct system propels harvested cotton material to a driven harvested crop material processor, means for providing a processor drive signal indicative of material processor drive loading, and second means responsive to the air duct system air pressure indication and the drive signal for facilitating adjustment of an operating speed of the harvester dependent on the air duct system pressure indication and the processor drive signal to optimize usage of duct system and material processor capacities while preventing material overload in either of the duct system and the material processor; and wherein the second means responsive to the air duct system air pressure indication and the drive signal for facilitating adjustment of an operating speed includes a harvester speed controller automatically controlling forward harvester speed to facilitate automatic operation at speeds wherein at least one of the duct system and the material processor is operating near maximum capacity.

2. The monitor system as set forth in claim 1 wherein the air pressure indication is indicative of the difference in air pressure between the air duct system and the atmosphere.

3. The monitor system as set forth in claim 1 wherein the pressure sensor means includes temperature compensation.

4. A monitor system for a cotton harvester including a harvesting unit for removing cotton crop material from a field and an air duct system for propelling the removed crop material away from the harvesting unit, the air duct system having a maximum material conveying capacity, the monitor system including air pressure sensor means for providing an air duct system air pressure indication indicative of the amount of cotton material in the air duct system, and means responsive to the system pressure indication providing automatic control of the harvester to operate the air duct system generally at or near the maximum material conveying capacity, wherein the air duct system includes a nozzle inducing a vacuum in the system upstream of the nozzle, and wherein the pressure sensor means is located upstream of the nozzle and senses air pressure upstream of the nozzle.

5. A monitor system for a cotton harvester including a harvesting unit for removing cotton crop material from a field and an air duct system for propelling the removed crop material away from the harvesting unit, the air duct system having a maximum material conveying capacity, the monitor system including air pressure sensor means for providing an air duct system air pressure indication indicative of the amount of cotton material in the air duct system, and means responsive to the system pressure indication providing automatic control of the harvester to operate the air duct system generally at or near the maximum material conveying capacity, wherein the means responsive to the system pressure includes a harvester speed controller, and wherein the speed controller is responsive to the air pressure indication to automatically control harvester speed.

6. The monitor system as set forth in claim 5 wherein the harvester includes a processor for processing the removed crop material at or below a processor capacity, a processor monitor for providing a processor signal indicative of the amount of capacity of the processor being utilized, wherein the speed controller is also responsive to the processor signal to control harvester speed.

7. The monitor system as set forth in claim 6 wherein the speed controller selectively controls the harvester speed dependent on proximity of an air pressure indication to a maximum capacity condition air pressure indication.

8. A monitor system for a cotton harvester including a harvesting unit for removing cotton crop material from a field and an air duct system for propelling the removed crop material away from the harvesting unit, the air duct system having a maximum material conveying capacity, the monitor system including air pressure sensor means for providing an air duct system air pressure indication indicative of the amount of cotton material in the air duct system, and means responsive to the system pressure indication providing automatic control of the harvester to operate the air duct system generally at or near the maximum material conveying capacity, wherein the pressure sensor means comprises a differential pressure sensor providing a differential air pressure indication between the air duct system and atmosphere indicative of the amount of material in the duct system and proximity to a capacity condition of the air duct system, and the means responsive to the system pressure indication comprises a harvester speed control for automatically controlling harvester speed to optimize harvester productivity and prevent an over-capacity condition in the air duct system, and a harvester processor sensor for providing processor signal indicative of available capacity of a crop material processor on the harvester, and wherein the speed control is also responsive to the processor signal.

9. The monitor system as set forth in claim 8 wherein the speed control includes processor structure connected to the pressure sensor and the processor sensor and controlling speed dependent on the sensor signal for preventing overloading of the crop material processor.

10. The monitor system as set forth in claim 9 wherein the speed control is also responsive to the processor sensor to prevent an overload of the cleaner.

11. The monitor system as set forth in claim 10 including an indicating device having an output providing an operator indication of the proximity of the amount of material in the duct system to the maximum material conveying capacity above which a blockage is likely.

12. The monitor system as set forth in claim 11 wherein the indicating device also provides an operator indication of the proximity of the processor to a processor drive overload condition.

13. The monitor system as set forth in claim 12 including a plurality of shaft monitors connected to the driven harvested crop material processor and providing the processor drive signal.

* * * * *